United States Patent [19]
Funato

[11] Patent Number: 4,505,537
[45] Date of Patent: Mar. 19, 1985

[54] LIGHT SCANNING APPARATUS
[75] Inventor: Hiroyoshi Funato, Chigasaki, Japan
[73] Assignee: Ricoh Company, Ltd., Japan
[21] Appl. No.: 507,177
[22] Filed: Jun. 23, 1983
[30] Foreign Application Priority Data
   Jun. 24, 1982 [JP] Japan .................. 57-107588
   Jun. 24, 1982 [JP] Japan .................. 57-107589
[51] Int. Cl.³ ............................................. G02B 27/17
[52] U.S. Cl. ................................... 350/3.71; 350/6.7; 235/454; 235/457
[58] Field of Search .............. 235/454, 457; 350/3.71, 350/6.2, 6.7, 162.2

[56] References Cited
U.S. PATENT DOCUMENTS
   4,125,860 11/1978 Ishii et al. .................. 350/162.11
   4,385,831 5/1983 Ruell ........................... 350/3.71

Primary Examiner—Bruce Y. Arnold
Assistant Examiner—William Propp
Attorney, Agent, or Firm—Guy W. Shoup

[57] ABSTRACT

The present invention provides a light scanning apparatus including a semiconductor laser as its light source, a hologram disk having a plurality of equidistant linear gratings of hologram arranged in the form of a circle, which is driven to rotate at constant speed in a predetermined direction, a first optical system for leading the light from the laser to be incident upon one of the gratings, and a second optical system for leading the light diffracted by said one grating to a scanning surface. In one aspect, the second optical system is so structured to maintain the scanning surface to be in conjugate relation in geometric optics with the surface of said one grating thereby allowing to keep the scan line at a desired position even if the oscillation wavelength of the light varies. In another aspect, the incident angle of the light into the one grating is varied in accordance with the oscillation wavelength of the light so as to maintain a constant diffracted angle.

10 Claims, 11 Drawing Figures

LIGHT SCANNING APPARATUS

BACKGROUND OF THE INVENTION

1. Field of the Invention

This invention generally relates to a light scanning apparatus for causing a light beam to scan along a predetermined path, and, in particular, to a light scanning apparatus employing a semiconductor laser for generating a scanning light beam.

2. Description of the Prior Art

Recently, the semiconductor laser has attracted attention as an information processing light source which is compact in size and low in cost; however, one of the problems residing in the characteristics of the laser is that the oscillation wavelength varies depending upon the temperature. This is because, the energy band gap of the activating layer varies as the temperature changes. One such example is shown in FIG. 1, in which the abscissa is taken for the temperature of a heat sink on which a semiconductor laser is mounted and the ordinate is taken for the oscillation wavelength of the laser output. As shown, as the temperature increases, the oscillation wavelength gradually shifts toward a longer wavelength region, and when the temperature has increased beyond a certain level, the oscillation wavelength abruptly jumps to a larger level as indicated by the dashed line. This phenomenon may be explained such that the oscillation wavelength gradually shifts toward a larger wavelength region as the energy band gap of the activating layer becomes smaller due to an increase in temperature, and when such a gradual change in oscillation wavelength has reached a certain level, the longitudinal mode of oscillation changes to the next mode of oscillation. Typically, such a gradual change in oscillation wavelength occurs at the rate of approximately 0.05–0.07 nm/°C.; on the other hand, a jump in oscillation wavelength is in the order of approximately 0.3 nm.

When a semiconductor laser having such a temperature dependent characteristic is employed as a light source of a light scanning apparatus including a diffraction type light deflecting element such as a hologram light deflector, there will be created a problem of fluctuations in pitch due to temperature variations. That is, changes in the oscillation wavelength of a light beam from a semiconductor laser cause changes in the diffraction angle, and, as a result, the beam spot on the scanning surface will be shifted in position in relation thereto. FIG. 2 illustrates a schematic diagram of a light scanning apparatus which is useful for explaining the above-described problem. The apparatus of FIG. 2 includes a hologram disk 1 fixedly mounted on the shaft of a motor M and serving as a light beam deflector. As shown in FIG. 3, the hologram disk 1 is comprised of a support disk and a plurality of equidistant linear gratings 1a arranged circularly around the rotating axis of and on the flat surface of the disk. Thus, the hologram disk 1 is driven to rotate in a predetermined direction at constant speed during operation. The light emitted from a semiconductor laser light source 2 is shaped into a parallel light beam as passing through a lens 3, which in turn is incident on the hologram disk 1 at an angle $\theta_i$. The diffracted light beam coming out of the hologram disk 1 at an angle of $\theta_d$ is reflected by a mirror 4 and focused onto a point $P_0$ on a scanning surface 6 by means of a lens 5.

As well known in the art, the relation between the angles $\theta_i$ and $\theta_d$ may be expressed in the following manner.

$$\sin \theta_d = \lambda/d - \sin \theta_i \tag{1}$$

where d indicates the pitch of a hologram grating and $\lambda$ indicates the wavelength of laser light.

When the oscillation wavelength $\lambda$ of the laser varies due to a change in temperature, the diffraction angle $\theta_d$ changes, so that, as shown in FIG. 2 by the dotted line, the beam spot on the scanning surface 6 slightly shifts its position from point $P_0$ to point $P_1$. Such a shift in position by the amount of $\Delta P$ will produce a fluctuation in pitch of the scanning line.

From the above equation (1), we can derive the relation between a change in wavelength $\Delta \lambda$ and a change in diffraction angle $\Delta \theta_d$ as follows:

$$\Delta \theta_d \approx \Delta \lambda / (d \cos \theta_d) \tag{2}$$

On the other hand, use is often made of the so-called $f\theta$ lens as the convergent lens 5, and, with f indicating its focusing distance, the shift amount in position $\Delta P$ of the beam spot or light convergent point on the scanning surface 6 may be expressed in the following manner.

$$\Delta P = f \Delta \theta_d (f \Delta \lambda) / (d \cos \theta_d) \tag{3}$$

It is obvious from the above equation (3) that the amount of shift in position $\Delta P$ is proportional to the amount of variation in wavelength $\Delta \lambda$.

For this reason, in order to make the amount of shift in scanning position in the structure of FIG. 2 to be minimum, the amount of variation in wavelength of the light from the semiconductor laser 2 must be made as small as possible, which in turn requires to prevent the semiconductor laser 2 from changing its temperature. For example, if it is desired to limit the amount of shift in beam spot position not to exceed 10 microns under the conditions of f=300 mm, d=0.55 microns and $\theta_d=45°$, the amount of variation in wavelength must be maintained at 0.01 nm or less as calculated from the above equation (3). This implies that the temperature variation of the semiconductor laser 2 must be maintained at approximately 0.1° C. or less, which is practically very difficult to do even if use is made of a precise temperature control means such as an electronic cooling element. Thus, the above-described problem has constituted one of the obstacles in fabricating a practical hologram light scanning apparatus employing a semiconductor laser as its light source.

SUMMARY OF THE INVENTION

The above-described disadvantages have been obviated by the advent of the present invention which provides an improved light scanning apparatus.

It is therefore a primary object of the present invention to provide an improved light scanning apparatus.

Another object of the present invention is to provide a light scanning apparatus having an enhanced scanning characteristic.

A further object of the present invention is to provide a light scanning apparatus capable of employing a semiconductor laser as a light source without causing any deterioration in scanning characteristics.

A still further object of the present invention is to provide a light scanning apparatus employing a semiconductor laser as its light source, which is capable of scanning a light beam along a predetermined path along a scanning surface at all times.

Other objects, advantages and novel features of the present invention will become apparent from the following detailed description of the invention when considered in conjunction with the accompanying drawings.

DESCRIPTION OF THE PREFERRED EMBODIMENTS

Figure 2:
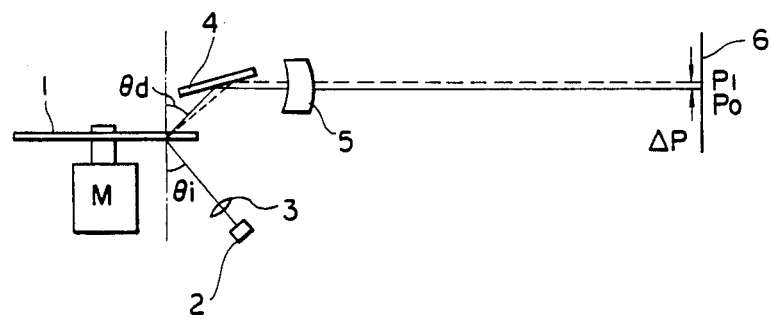
FIG. 2 is a schematic illustration showing the overall structure of a typical light scanning apparatus which is useful in explaining the shift in scanning light beam due to a change in oscillation wavelength caused by a temperature variation.
Figure 3:
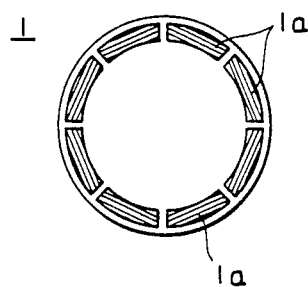
FIG. 3 is a plan view of the hologram disk 1 employed in the apparatus shown in FIG. 2.
Figure 4:
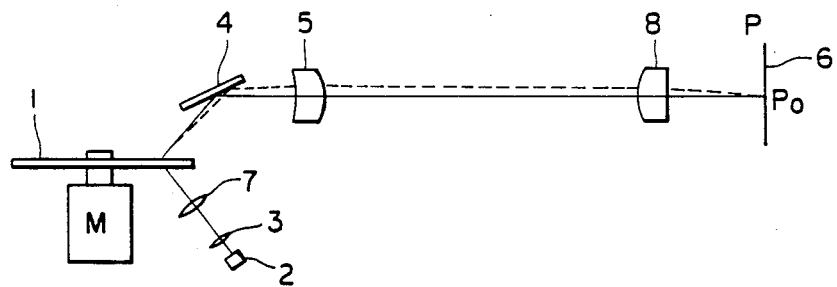
FIG. 4 is a schematic illustration showing the overall structure of a light scanning apparatus constructed in accordance with one embodiment of the present invention.

Briefly stated, in accordance with one aspect of the present invention, there is provided a light scanning apparatus which is so structured that the diffraction surface of a hologram disk is in conjugate relation in geometrical optics with the scanning surface. Described more in detail with reference to FIG. 4 wherein like numerals are used to indicate like elements in FIG. 2. As shown in FIG. 4, cylindrical lenses 7 and 8 are additionally provided as compared with the apparatus shown in FIG. 2. In the apparatus of FIG. 4, the light emitting from the semiconductor laser 2 is shaped into a parallel light beam as passing through the spherical lens 3, and then the thus formed parallel light beam is made convergent in the radial direction of the hologram disk 1 by means of the cylindrical lens 7 prior to impingement upon the disk 1. It is to be noted that the so-called beam waist of this convergent light beam is generally not formed on the surface of the disk 1.

The convergent light beam incident upon the disk 1 is diffracted by the holograms formed on the surface of the disk 1, and such a diffracted light beam is then changed its advancing direction by the mirror 4 and focused onto a convergent spot $P_0$ on the scanning surface 6 after passing through the $f\theta$ lens 5 and also cylindrical lens 8. The cylindrical lens 8 is so structured to have a refractive force to have the light beam refracted in the direction normal to the scanning direction on the scanning surface 6. Thus, a combined optical system including the $f\theta$ lens 5 and cylindrical lens 8 for leading the light from the disk 1 to the scanning surface 6 contributes to place the hologram surface of the disk 1 and the scanning light spot P on the scanning surface in conjugate relation in terms of geometrical optics at all times. With such a structure, the light scanning apparatus may be made free of being adversely affected by temperature variations, or changes in oscillation wavelength of the scanning light beam due to such temperature variations. That is, as indicated by the dotted line in FIG. 4, even if the diffraction angle of the diffracted light beam at the disk 1 changes due to a change in oscillation wavelength in the scanning light beam generated by the semiconductor laser 2, for example, by a temperature variation at the laser 2, since the point of diffraction at the hologram surface on the disk 1 remains unchanged and the hologram surface and the scanning surface 6 are in conjugate relation in terms of geometrical optics, the position of the convergent light spot or scanning beam spot on the scanning surface 6 remains unchanged at point $P_0$.

The advantages of the above-described embodiment of the present invention will be evaluated numerically hereinbelow.

It is assumed that the optical system of the apparatus shown in FIG. 4 has the following specific values.

Hologram grating constant: 1,813 lines/mm
Light wavelength: 780 nm
Incident angle to hologram: 45°
Focal distance f of $f\theta$ lens: 296 mm
Distance between hologram and first principal point of $f\theta$ lens: 93.0 mm
Distance between scanning surface and second principal point of $f\theta$ lens: 293.4 mm The dimensions as to the cylindrical lens 8 provided in accordance with the present invention are assumed to have the following values.

Figure 1:
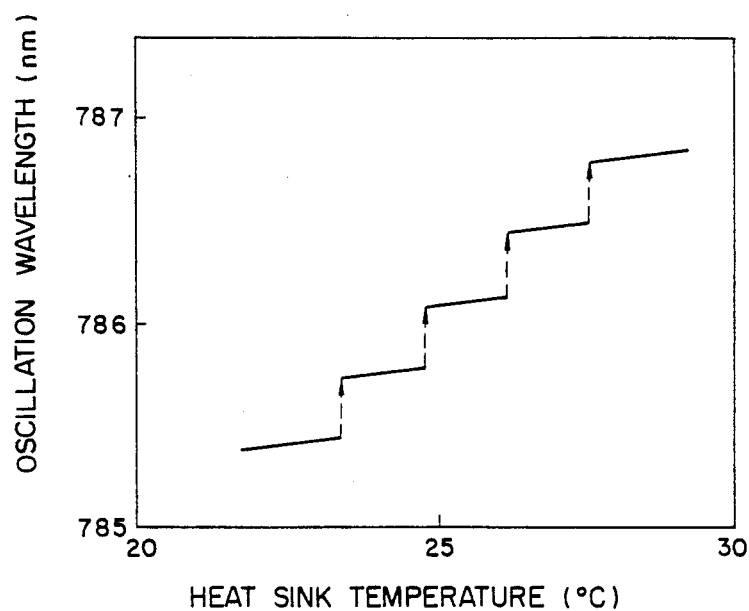
FIG. 1 is a graph showing as an example how the oscillation wavelength varies depending upon the temperature of a semiconductor laser with the abscissa taken for the temperature of a heat sink on which the semiconductor laser is mounted and the ordinate taken for the oscillation wavelength of the light emitting from the laser.
Figure 5:
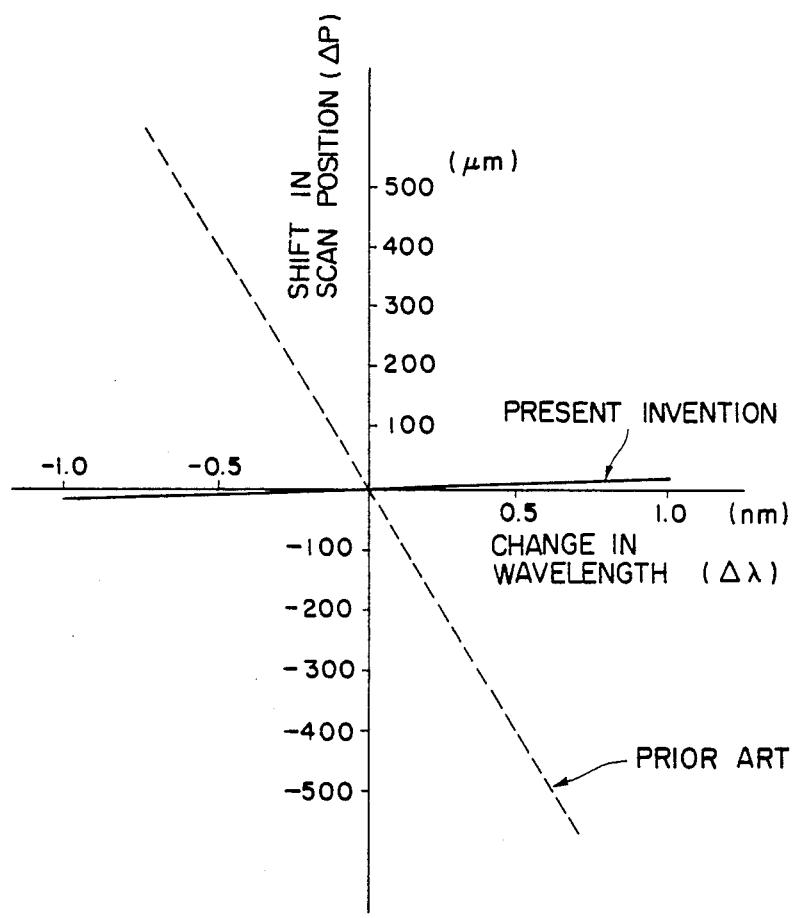
FIG. 5 is a graph showing the relation between the amount of change in wavelength of a scanning light and the amount of shift in scan position of a scanning light beam on the scanning surface.

Focal distance of lens 8: 38.5 mm
Distance between second principal point of $f\theta$ lens and first principal point of lens 8: 252 mm
Distance between second principal point of lens 8 and scanning surface: 41.4 mm Under the above-mentioned conditions, the amount of shift in position of the scanning light spot on the scanning surface 6 was measured as a function of the change in wavelength of the light from the light source 2 caused, for example, by temperature variations at the light source 2, and the measured results are plotted in the graph of FIG. 5, in which the abscissa is taken for the change in wavelength of the scanning light in nm and the ordinate is taken for the amount of shift in position of the scanning light spot on the scanning surface 6 measured in the direction normal to the main scanning direction. The typical characteristic line for the prior art apparatus is also shown in the graph of FIG. 5, and it is indicated that the scanning position shifts rather significantly depending upon the change in wavelength of the scanning light beam. For example, when the wavelength changes over 0.3 nm corresponding to a jump in FIG. 1, the scanning light spot will shift its scanning position over the distance of approximately 240 microns in the direction normal to the main scanning direction. On the other hand, in accordance with the above-described embodiment of the present invention, as indicated by the solid line in FIG. 5, even if the scanning light beam has changed its wavelength over 0.3 nm, the scanning spot shifts its position only slightly over the distance of approximately 5 microns. As a result, in accordance with the present invention, the effect of wavelength variation on the position of a scanning light beam may be reduced to approximately 1/50 of that of the prior art.

Figure 6:
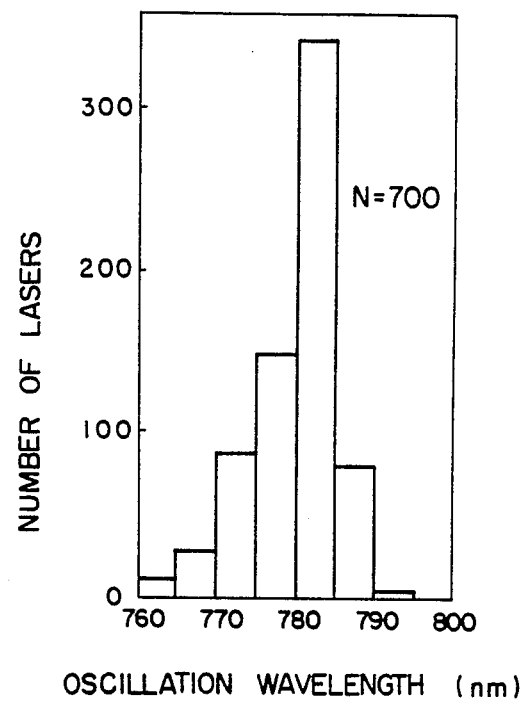
FIG. 6 is a graph showing a typical distribution of semiconductor lasers plotted according to the oscillation wavelength of output light for a lot of 700 lasers.

Now, description will be made with respect to another aspect of the present invention which is directed to prevent the scanning line from bowing along the main scan line, which is otherwise brought about mainly due to differing oscillation wavelengths of the scanning light beam generated by semiconductor lasers. Described more in detail, when semiconductor lasers are mass-produced, individual semiconductor lasers thus produced will have slightly different oscillation wavelengths. In the case of most commonly used semiconductor lasers of GaAlAs family, the oscillation wavelength may be varied by varying the mixture ratio between GaAs and AlAs. Conversely, in the case of producing semiconductor lasers of the same oscillation wavelength massively, if the mixture ratio fluctuates slightly during manufacturing process, there will result scattering of oscillation wavelength in the lasers produced. Such a problem will be best understood when reference is made to FIG. 6 which shows the distribution of oscillation wavelength for a lot of 700 semiconductor lasers. In the graph of FIG. 6, the abscissa is taken for the oscillation wavelength in nm and the ordinate is taken for the number of lasers having a predetermined range of oscillation wavelength.

On the other hand, the scanning line on a flat surface when scanned by diffraction elements provided on the flat surface of a rotating medium such as a hologram disk, in general, tends to be curved thereby producing a certain amount of bow in the scanning line. In order to obtain an approximate straight scanning line under such circumstances, the following relations must hold among the parameters of incident angle to hologram $\theta_i$, diffraction angle $\theta_d$, grating pitch d of diffraction element and wavelength of reconstructing light $\lambda_r$.

$$\sin \theta_i = \lambda_r/d - d/\lambda_r \text{ and } \sin \theta_d = d/\lambda_r$$

In this manner, the light scanning apparatus is usually designed to minimize the bow amount of scanning line by optimizing the pitch of hologram grating and scanning optical system for a particular oscillation wavelength. However, since the oscillation wavelength of massively produced semiconductor lasers is scattered over a certain range as described above, it is highly likely that the semiconductor laser having the oscillation wavelength which is appreciably different from the design specification is incorporated into the apparatus. As a result, the scanning line will exhibit an appreciable bow due to such discrepancy between the real oscillation wavelength of the incorporated laser and the specified value in design specification.

With the foregoing as a premise, another embodiment of the present invention proposes to provide a light scanning apparatus capable of adjusting the incident angle $\theta_i$ to a diffraction element such as a hologram grating in correspondence with the oscillation wavelength of an incorporated semiconductor laser thereby allowing to prevent the bow of scanning line from occurring.

Figure 7:
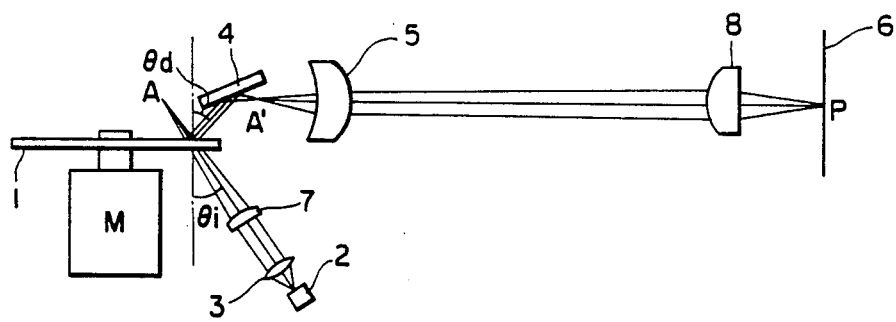
FIG. 7 is a schematic illustration showing the overall structure of a typical light scanning apparatus employing a semiconductor laser as its light source.

Referring to FIG. 7, there is shown the overall structure of a typical light scanning apparatus which is similar to the previously described example so that like numerals are employed to indicate like elements. The hologram disk 1 mounted on the rotating shaft of the motor M is driven to rotate in a predetermined direction at constant speed. As previously described, a plurality of holograms each forming an equidistant linear grating are provided on the top surface of the disk 1 as arranged in the form of a circle with its center located at the rotating axis of the shaft of the motor M. The light emitting from the semiconductor laser 2 as a light source proceeds to the collimator lens 3 where the light is converted into a parallel light beam, which in turn proceeds to the cylindrical lens 7. The cylindrical lens 7 causes the light beam to be convergent in the radial direction of the disk 1 while maintaining the parallel nature in the circumferential direction of the disk 1. Thus, the light beam emerging from the lens 7 forms a beam waist at point A in the radial direction while the light beam maintains its parallel nature in the direction of circumference of the disk 1.

When the light beam passes through the disk 1, it is diffracted at an angle of $\theta_d$. Similarly with the 0th order light beam, such a diffracted light beam is also convergent in one predetermined direction so that it forms a beam waist at point A' corresponding to point A for the non-diffracted light beam. Thus, the light beam becomes divergent after passing the point A' and enters into the f$\theta$ lens 5. After being made convergent by the lens 5, the light beam proceeds to the cylindrical lens 8, which has no converging function in the scanning direction on the scanning surface 6 but has a converging function in the direction normal to the scanning direction. The light beam is then focused onto the scanning surface 6 at point P and it scans across the scanning surface 6 as the disk 1 rotates as best shown in FIG. 8.

Figure 8:
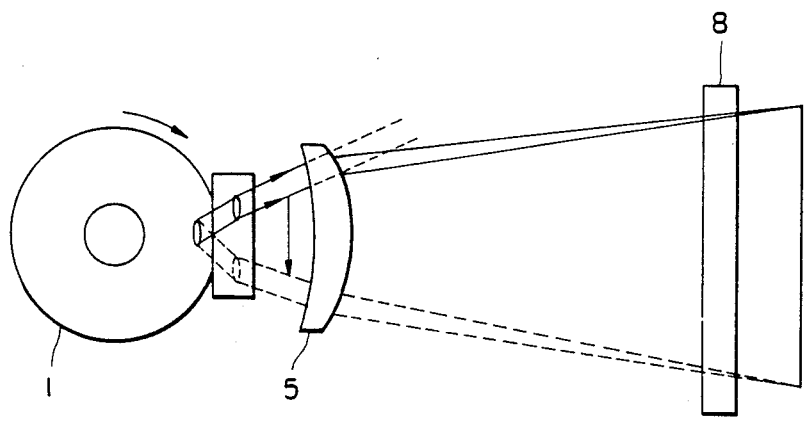
FIG. 8 is a plan view of the apparatus shown in FIG. 7.
Figure 9:
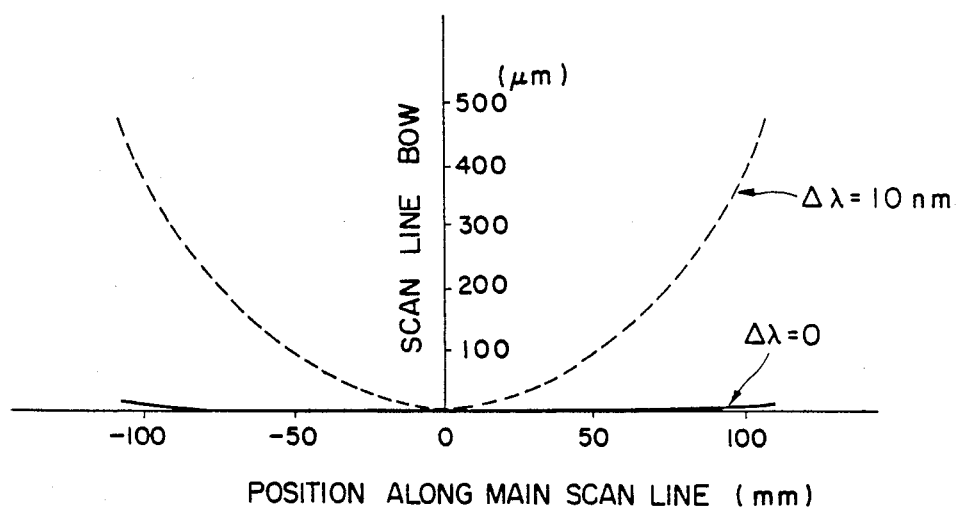
FIG. 9 is a graph showing the typical scanning characteristic of the apparatus shown in FIGS. 7 and 8.

Assuming that the apparatus shown in FIGS. 7 and 8 has the same parameter values as described previously, the graph of FIG. 9 indicates the effect of discrepancy in oscillation wavelength of a scanning light beam from a predetermined value by the amount of 10 nm on the scan line. In the graph of FIG. 9, the abscissa is taken for the main scan line with the "0" indicating its center and the ordinate is taken for the amount of bow or deviation from the straight scan line. In FIG. 9, the solid curve indicates the case when the oscillation wavelength coincides with a predetermined value; whereas, the dotted curve indicates the case when the oscillation wavelength differs from the specified value by 10 nm. It should be easily understood from this graph that the bow amount of scan line is 10 microns or less if the wavelength agrees with the specified value, but in the case of disagreement by 10 nm, the amount of deviation from the straight scan line reaches the value of approximately 480 microns, which is disadvantageous.

Figure 10:
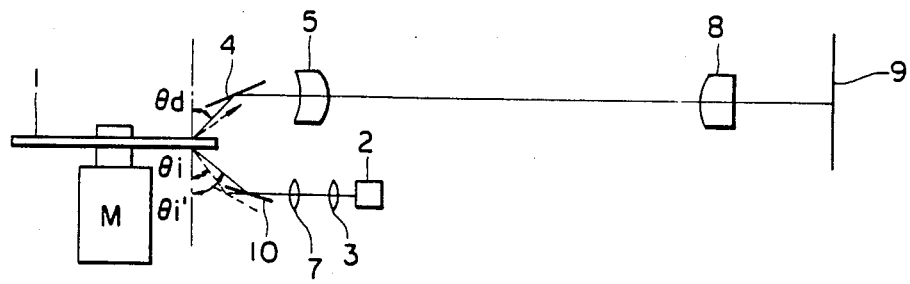
FIG. 10 is a schematic illustration showing a light scanning apparatus employing a semiconductor laser as its light source constructed in accordance with another embodiment of the present invention.

As shown in FIG. 10, in accordance with the second aspect of the present invention, there is provided a light scanning apparatus which is structured such that the incident angle of the scanning light beam into the hologram disk 1 may be varied corresponding to the amount of deviation of the oscillation wavelength of the scanning light beam from a predetermined value. In this particular embodiment, a reflecting mirror 10 is additionally provided in the optical path between the cylindrical lens 7 and the hologram disk 1. Thus, by adjusting the position and orientation of the mirror 10 suitably in relation to the oscillation wavelength of the scanning light beam generated by the laser 2, the incident angle of the scanning light beam into the disk 1 may be set at an optimum value thereby allowing to obtain a scan line having a desired level of straightness.

Now, for a predetermined value of oscillation wavelength $\lambda_0$, the light scanning apparatus is so constructed to satisfy the following relation.

$$\sin \theta_i + \sin \theta_d = \lambda_0/d \quad (4)$$

When the oscillation wavelength differs from a set value by the amount of $\Delta\lambda$, if the scanning light were to be incident upon the disk 1 with the same incident angle, the diffracted light beam would be directed in the direction indicated by the dotted line in FIG. 10, and, as a result, a significant amount of bow would be created in the scan line on the scanning surface.

However, in accordance with the present invention, in order to keep such a bow at minimum, the adjusting mirror 10 is moved to the position where the light beam is incident upon the disk 1 at an incident angle of $\theta_i'$ which allows the light beam to be diffracted at a desired angle of $\theta_d$. In this particular embodiment, the adjusting mirror 10 is changed in position as well as in orientation. It is to be noted also that any conventional means obvious for those skilled in the art may be used to provide the mirror 10 so adjustable. It should be noted however that any other structure may be provided to change the incident angle suitably in relation to the particular oscillation wavelength of the light beam emitted from the laser 2.

In order to make the light beam diffracted at an angle of $\theta_d$, the following relation must be satisfied.

$$\sin \theta_i' + \sin \theta_d = (\lambda_0 + \Delta\lambda)/d \quad (5)$$

Therefore, we get $$\theta_i' = \sin^{-1} ((\lambda_0 + \Delta\lambda)/d - \sin \theta_d). \quad (6)$$

From equations (4) and (6), we get $$\theta_i' = \sin^{-1} (\sin \theta_i + \Delta\lambda/d). \quad (7)$$

As previously described, since $\theta_i = 45°$ and $d = 551.6$ nm for $\Delta\lambda = 10$ nm, we can get $\theta_i' = 46.49°$ from equation (7). Thus, it is only necessary to move the adjusting mirror 10 to change the incident angle of the light beam in accordance with the level of discrepancy in oscillation wavelength from a predetermined value in order to keep the scan line as straight as possible.

Figure 11:
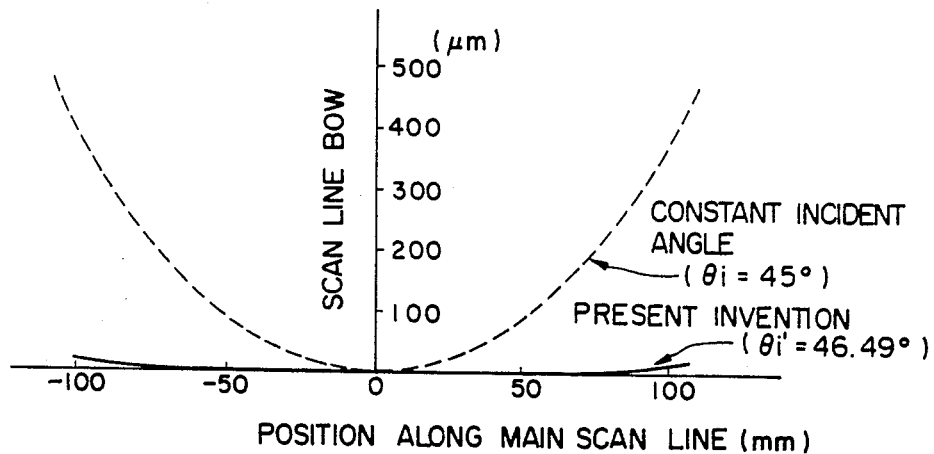
FIG. 11 is a graph showing the improved scanning characteristic of the apparatus of FIG. 10.

FIG. 11 shows a graph illustrating the effect of varying the incident angle to an optimum value in relation to the deviation of the oscillation wavelength of the scanning light beam on the straightness of scan line. That is, in the case where the incident angle of the light beam is maintained at constant, i.e., at 45°, even if the actual oscillation wavelength disagrees from a predetermined value by 10 nm, there will appear a significant bow in the resulting scan line, as indicated by the dotted line in FIG. 11. As mentioned before, the amount of bow in this case reaches approximately 480 microns. On the other hand, when the incident angle is suitably varied as described in detail above, the amount of bow may be maintained 15 microns or less thereby allowing to reduce the amount of bow to 1/30 of that when the incident angle is not changed.

In this second embodiment, what is critical is to suitably vary the incident angle in relation to the amount of deviation of oscillation wavelength from a predetermined value, and, therefore, any structure may be applied to attain such objective. For example, instead of providing the adjusting mirror 10 or in addition to the provision of the mirror 10, the entire optical system for directing a light beam toward the disk 1 may be so structured to be movable in position so as to adjust the incident angle suitably.

While the above provides a full and complete disclosure of the preferred embodiments of the present invention, various modifications, alternate constructions and equivalents may be employed without departing from the true spirit and scope of the invention. For example, the present invention may also be applied to the reflecting type hologram other than the transmitting type hologram as described previously. Therefore, the above description and illustration should not be construed as limiting the scope of the invention, which is defined by the appended claims.

What is claimed is:

1. A light scanning apparatus for scanning along a scan line on a scanning surface by a light beam comprising:
   a rotating disk supported to be driven to rotate in a predetermined direction at constant speed;
   a plurality of equidistant linear gratings fixedly mounted on said disk as arranged in the form of a circle;
   a semiconductor laser for emitting light;
   a first optical system for leading said light from said laser to be incident upon one of said gratings; and
   a second optical system for leading the light diffracted by said one grating to said scanning surface, said second optical system being so structured to maintain the surface of said one grating and said scanning surface to be in conjugate relation in terms of geometrical optics in the direction normal to the scanning direction of said scan line.

2. A light scanning apparatus of claim 1 wherein said gratings are comprised of holograms.

3. A light scanning apparatus of claim 2 wherein said diffracted light is the first order diffraction light.

4. A light scanning apparatus of claim 3 wherein said first optical system includes a spherical lens for making the light emitting form said laser to be parallel light and a cylindrical lens for making said parallel light to be convergent only in the radial direction of said disk.

5. A light scanning apparatus of claim 3 wherein said second optical system includes a reflecting mirror for changing the direction of advancement of the light diffracted by said one grating, an f$\theta$ lens for directing said light from said mirror in a desired direction and a cylindrical lens for making the light from said f$\theta$ lens convergent only in the direction normal to the scanning direction.

6. A light scanning apparatus for scanning along a scan line on a scanning surface by a light beam comprising:
   a rotating disk supported to be driven to rotate in a predetermined direction at constant speed;

a plurality of equidistant linear gratings fixedly mounted on said disk as arranged in the form of a circle;

a light source for emitting light;

a first optical system for leading said light from said light source to be incident upon one of said gratings;

a second optical system for leading the light diffracted by said one grating to said scanning surface; and means for adjusting the incident angle of said light incident upon said one grating in accordance with the oscillation wavelength of said light emitting from said light source thereby allowing a constant diffraction angle by said one grating to be maintained.

7. A light scanning apparatus of claim 6 wherein said gratings are comprised of holograms and said light source includes a semiconductor laser.

8. A light scanning apparatus of claim 7 wherein said diffracted light is the first order diffraction light.

9. A light scanning apparatus of claim 8 wherein said means for adjusting includes a movable reflecting mirror which is movable in position as well as in orientation thereby allowing the changing of the incident angle of the light into said one grating in accordance with the oscillation wavelength of said light.

10. A light scanning apparatus of claim 8 wherein said means for adjusting moves said first optical system and said light source in unison to change the incident angle of the light into said one grating in accordance with the oscillation wavelength of said light.

* * * * *